(12) United States Patent
Liu et al.

(10) Patent No.: US 7,356,093 B2
(45) Date of Patent: Apr. 8, 2008

(54) ENHANCED WIRELESS COMMUNICATION SYSTEM AND METHOD THEREOF

(76) Inventors: Wen-Chung Liu, 5F., No. 5, Alley 1, Lane 14, Yisin 2nd Rd., Sec. 1, Kaohsiung (TW) 806; Gin-Kou Ma, No. 9, Lane 328, Chung Hsing Rd., Sec. 3, Chutung, Hsinchu (TW) 310

( * ) Notice: Subject to any disclaimer, the term of this patent is extended or adjusted under 35 U.S.C. 154(b) by 565 days.

(21) Appl. No.: 10/618,632

(22) Filed: Jul. 15, 2003

(65) Prior Publication Data
US 2004/0091061 A1    May 13, 2004

Related U.S. Application Data

(60) Provisional application No. 60/425,733, filed on Nov. 13, 2002.

(51) Int. Cl.
*H04L 27/20* (2006.01)
(52) U.S. Cl. .................................. 375/308; 375/267
(58) Field of Classification Search ............ 375/260, 375/267, 271, 279–281, 284, 299, 308, 329, 375/332, 347–349, 316; 455/101, 103, 500, 455/504, 132, 137; 370/334, 345
See application file for complete search history.

(56) References Cited

U.S. PATENT DOCUMENTS

| | | | | |
|---|---|---|---|---|
| 6,005,855 A * | 12/1999 | Zehavi et al. | ................ | 370/335 |
| 6,115,427 A * | 9/2000 | Calderbank et al. | ........ | 375/267 |
| 6,314,289 B1 * | 11/2001 | Eberlein et al. | ............ | 455/427 |
| 6,549,585 B2 * | 4/2003 | Naguib et al. | ............... | 375/267 |
| 6,700,926 B1 * | 3/2004 | Heikkila et al. | ............. | 375/221 |
| 6,891,897 B1 * | 5/2005 | Bevan et al. | ................ | 375/265 |
| 7,010,053 B2 * | 3/2006 | El-Gamal et al. | ........... | 375/267 |

OTHER PUBLICATIONS

John G. Proakis, "Digital Communications", 2000, McGraw Hill, 4th Edition, pp. 540-541.*
Foschini et al., "Simplified Processing for High Spectral Efficiency Wireless Communication Employing Multi-Element Arrays," IEEE Journal on Selected Areas in Communications, vol. 17, pp. 1841-1852, Nov. 1999.
Berrou et al., "Near Optimum Error Correcting Coding and Decoding: Turbo-Codes," IEEE Transactions on Communications, vol. 44, pp. 1261-1271, Oct. 1996.

(Continued)

*Primary Examiner*—Khanh C. Tran
(74) *Attorney, Agent, or Firm*—Yitai Hu; Akin Gump Strauss Hauer & Feld

(57) ABSTRACT

A communications system that comprises a channel encoder for encoding a plurality of information bits, a mapping unit coupled to the channel encoder for mapping the plurality of information bits into a first set of quadrature phase shift keying (QPSK) symbols and a second set of QPSK symbols, wherein every successive predetermined number of information bits are mapped to a first QPSK symbol and a second QPSK symbol in one symbol period in accordance with a mapping table, a first modulation unit coupled to the mapping unit for converting the first QPSK symbol into a first QPSK constellation symbol, and a second modulation coupled to the mapping unit for converting the second QPSK symbol into a second QPSK constellation symbol.

13 Claims, 3 Drawing Sheets

OTHER PUBLICATIONS

Alamouti, "A Simple Transmit Diversity Technique for Wireless Communications," IEEE Journal on Selected Areas in Communication, vol. 16, pp. 1451-1458, Oct. 1998.

Seshadri et al., "Space-Time Codes for High Data Rate Wireless Communication: Performance Criterion and Code Construction," IEEE Transactions on Information Theory, vol. 44, pp. 744-765, Mar. 1998.

Stefanov et al., "Turbo-Coded Modulation for Systems with Transmit and Receiver Antenna Diversity Over Block Fading Channels: System, Decoding Approaches, and Practical Considerations," IEEE Journal on Selected Areas in Communication, vol. 19, pp. 958-968, May 2001.

Liu et al., "Full Rate Space-Time Turbo Codes," IEEE Journal on Selected Areas in Communications, vol. 19, pp. 969-980, May 2001.

G. Bauch, "Concatenation of Space-Time Block Codes and Turbo-TCM," Proc. IEEE International Conference on Communications, vol. 2, pp. 1202-1206, Jun. 1999.

Gaspa et al., "Space-Time Coding for UMPT: Performance Evaluation in Combination with Convolutional and Turbo Coding," Proceedings of the 52$^{nd}$ IEEE Vehicular Technology Conference, vol. 1, pp. 92-98, Sep. 2000.

Tarokh et al., "Space-Time Block Coding for Wireless Communications: Performance Results," IEEE Journal on Selected Areas in Communications, vol. 17, pp. 451-460, Mar. 1999.

3GPP Standards: "UE Radio Transmission and reception (FDD)," TS 25.101 V5.2.0, Mar. 2002.

3GPP Standards: "Multiplexing and Channel Coding (FDD)," TS 25.212 V5.0.0, Mar. 2002.

\* cited by examiner

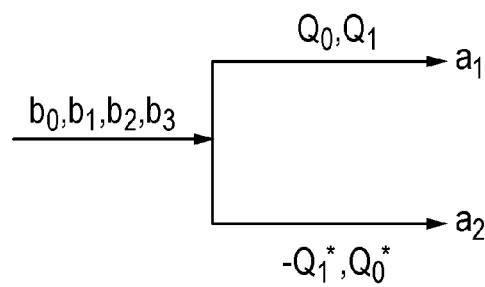
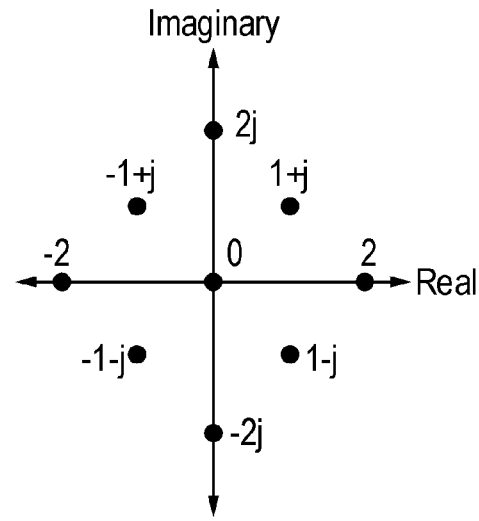
*FIG. 3A*
*(Prior Art)*
*FIG. 3B*
*(Prior Art)*
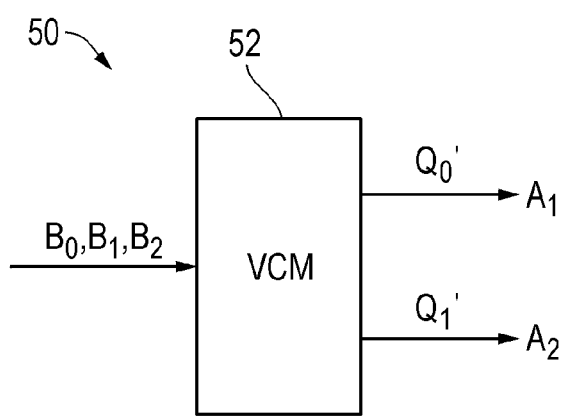
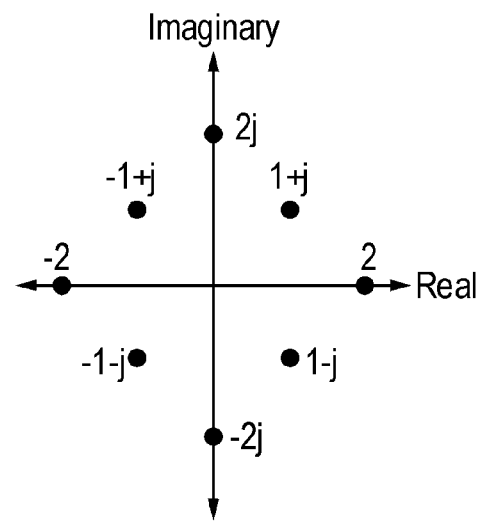
*FIG. 4A*
*FIG. 4B*

ENHANCED WIRELESS COMMUNICATION SYSTEM AND METHOD THEREOF

This patent application claims priority to U.S. Provisional Application Ser. No. 60/425,733 filed Nov. 13, 2002. This provisional application is expressly incorporated herein by reference.

DESCRIPTION OF THE INVENTION

1. Field of the Invention

This invention pertains in general to a communication system and, more particularly, to a third generation wireless communication system.

2. Background of the Invention

Modern wireless communication services should be able to provide high-speed data transmission for multimedia applications. For "third-generation" telecommunication systems, the ability to provide increased system capacity and data rate for individual users are some of the objectives. Generally in such systems, downlink transmission from a base station to a mobile station is more significant than uplink transmission because the asymmetric nature of Internet traffic such as web browsing and file transfer protocol ("FTP") downloads. An approach to enhance data transmission rate and efficiency over wireless channels employs coding techniques and multiple transmitter antennas. Such an approach has been discussed, for example, in "Simplified Processing for High Spectral Efficiency Wireless Communication Employing Multi-Element Arrays" by Foschini et al., IEEE Journal on Selected Areas in Communications, vol. 17, pp. 1841-1852 (November 1999).

Specifically, to protect information bits from contamination by background noises in a wideband code division multiple access ("WCDMA") system in 3rd Generation Partnership Project ("3GPP"), a channel coding technique is employed. The channel coding technique employs turbo codes or convolutional codes, which, for example, have been discussed by Berrou et al., in "Near Optimum Error Correcting Coding and Decoding: Turbo-Codes," IEEE Transactions on Communications, vol. 44, pp. 1261-1271 (October 1996), and specified in 3GPP standards: "UE Radio Transmission and Reception (FDD)," TS 25.101 V5.2.0. (March 2002). The 3GPP standards are available through the World Wide Web at http://www.3gpp.org.

Furthermore, to address the channel fading phenomenon, a conventional approach employs a transmit diversity technology, for example, multiple antennas, such that if a signal received from one transmitter antenna is in deep fade, a stronger signal is able to be received from a different transmitter antenna to maintain communication. One example of the conventional approach in 3GPP is space-time lock code ("STBC"), which has been discussed in, for example, by Alamouti in "A Simple Transmit Diversity Technique for Wireless Communications," IEEE Journal on Selected Areas in Communications, vol. 16, pp. 1451-1458 (October 1998).

Another example is space-time trellis-based code, which has been discussed in, for example, by Seshadri et al., in "Space-Time Codes for High Data Rate Wireless Communication: Performance Criterion and Code Construction," IEEE Transactions on Information Theory, vol. 44, pp. 744-765 (March 1998). The space-time trellis-based code may be superior to the STBC in the bit error rate ("BER"), but such advantage is obtained at the expense of complexity in encoding and decoding. To achieve better BER performance, in general, the space-time trellis-based codes employ iterative decoding. However, in a 3GPP communication system, the trellis-based coding technique, due to its complicated decoding structure, may cause double decoding delays if it is simultaneously used for both channel encoding and transmit diversity. Therefore, the trellis-based coding technique may not be suitable for real-time implementation.

In 3GPP, two types of trellis-based channel encoders, i.e., turbo codes and convolutional codes, have been specified and adopted to form specific space-time coding schemes. Examples of the space-time coding schemes using turbo codes and transmit diversity have been discussed in by Stefanov et al., in "Turbo-Coded Modulation for Systems with Transmit and Receiver antenna Diversity over Block Fading Channels: System Model, Decoding Approaches, and Practical Considerations," IEEE Journal on Selected Areas in Communications, vol. 19, pp. 958-968 (May 2001), and by Liu et al., in "Full Rate Space-Time Turbo Codes," IEEE Journal on Selected Areas in Communications, vol. 19, pp. 969-980 (May 2001). However, these examples focus on efficiency, instead of how to increase data rate in a 3GPP framework.

A general exemplary conventional space-time coding scheme based on the 3GPP standards is shown in FIG. 1. Referring to FIG. 1, a 3GPP frequency division duplex ("FDD") system 10 includes a dedicated transport channel ("DTCH") 12, a channel encoder 14, a rate-matching unit 16, and a STBC encoder 18. DTCH unit 12 transmits a number of 3,480 information bits coming from upper layers or users in every 10 milliseconds (ms), or 384 Kbps. Channel encoder 14, coupled to DTCH 12, takes the form of a turbo encoder and provides a turbo coding rate of 1/3. Channel encoder 14 also provides error detection through a cyclic redundancy check ("CRC"), and includes 16 padding CRC bits and 4 tail bits. The turbo code used in channel encoder 14 is a parallel-concatenated convolutional code ("PCCC") with 8-state constituent encoders (not shown) and one turbo code internal interleaver (not shown). The transfer function of the 8-state constitutent code for PCCC is expressed as follows:

$$G(D)=[1, (1+D+D^3)/(1+D^2+D^3)]$$

The transfer function has been described by Gaspa et al., in "Space-Time Coding for UMPT: Performance Evaluation in Combination with Convolutional and Turbo Coding," Proceedings of the $52^{nd}$ IEEE Vehicular Technology Conference, vol. 1, pp. 92-98 (September 2000), and 3GPP Standards: "Multiplexing and Channel Coding (FDD)", TS 25.212 V5.0.0 (March 2002), and will not be discussed further herein.

Again referring to FIG. 1, channel encoder 14 outputs a coded frame having 11,580 bits ((3,480+16+4)×3). Rate-matching unit 16 is coupled to channel encoder 14 and provides a 22% puncturing of the 11,580-bit coded frame, resulting in a net bit rate of 9,048 bits (11580×(1-22%)).

STBC encoder 18 includes a space-time block coding unit 182 coupled to rate-matching unit 16, and a pair of quadrature phase shift keying ("QPSK") modulation units 184 and 186, each coupled to space-time block coding unit 182. STBC encoder 18 functions to implement transmit diversity.

System 10 further includes antennas 20 and 22, respectively coupled to QPSK modulation units 184 and 186. STBC encoder 18 provides a coding rate of 1, and to match up with QPSK modulation, outputs 4,524 (9,048/2) successive QPSK symbols for each of antennas 20 and 22 in every 10 ms.

The QPSK mapping used in STBC encoder 18 is shown in FIGS. 2A and 2B. FIG. 2A is a QPSK signal constellation for QPSK mapping. Specifically, two successive bits are mapped to form one of a QPSK symbol 0, 1, 2 or 3. FIG. 2B shows the real and imaginary parts of the QPSK signal constellation, in which the QPSK symbols 0, 1, 2 and 3 shown in FIG. 2A correspond to 1, j, −1 and −j in FIG. 2, respectively.

An equivalent model of STBC encoder 18 is shown in FIG. 3A. Referring to FIG. 3A, the equivalent model includes four input information bits $b_0$, $b_1$, $b_2$ and $b_3$, and two antenna outputs $a_1$ and $a_2$. The basic idea of STBC encoder 18 has been described, for example, by Alamouti in "A Simple Transmit Diversity Technique for Wireless Communications," IEEE Journal on Selected Areas in Communications, vol. 16, pp. 1451-1458 (October 1998), and by Tarokh et al., in "Space-Time Block Coding for Wireless Communications: Performance Results," IEEE Journal on Selected Areas in Communications, vol. 17, pp. 451-460 (March 1999).

A space-time block code is defined by a p×m transmission matrix $G_m$, where m is the number of transmission antennas, and p is the number of symbols in a coded block. The entries of the matrix Gm are linear combinations of variables $x_1$, $x_2$, ..., $x_k$ and their conjugates. For example, for m=2, i.e., two transmitter antennas are used, $G_m$ is represented as:

$$G_2 = \begin{bmatrix} X_1 & X_2 \\ -X_2^* & X_1^* \end{bmatrix}$$

1 where $x_1^*$ and $x_2^*$ are the complex conjugates of $x_1$ and $x_2$, respectively.

In this case, $x_k$, for k=1, 2, is denoted by $Q_{k-1}$, which is one of QPSK symbol values. That is, every two successive bits, for example, $b_0$, $b_1$, are mapped to a QPSK symbol and then every two successive QPSK symbols, for example, $Q_0$ and $Q_1$, form a valid coded block. The signals transmitted from one antenna are $Q_0$ and $Q_1^*$, and simultaneously the signals transmitted from the other antenna are $Q_1$ and $Q_0^*$, where $Q_0^*$ and $Q_0^*$ are the complex conjugates of $Q_0$ and $Q_1$, respectively.

The two QPSK symbols simultaneously transmitted from the two antennas in one QPSK symbol period are air-combined and received by a receiver antenna. The signal constellation for the two air-combined QPSK symbols is shown in FIG. 3B. Referring to FIG. 3B, since each QPSK symbol is mapped to one of the values 1, j, −1 or −j, two combined QPSK symbols result in one of the values 2, 1+j, 2j, −1+j, −2, −1−j, −2j, 1−j or 0, thereby forming a 9-point signal constellation.

The combination of turbo coding and transmit diversity enables system 10 to utilize spatial and temporal redundancy to improve transmission efficiency without degrading BER performance. System 10 transmits information at 384 Kbps (bits per second) and utilizes successive 4,254 QPSK symbols time. However, since the transmission periods, or bandwidths, and the transmitter characteristics, or power, of system 10 are specified in 3GPP standards, to increase spectral efficiency through changing modulation schemes will increase system complexity.

SUMMARY OF THE INVENTION

Accordingly, the present invention is directed to ESD protection devices that obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the devices and methods particularly pointed out in the written description and claims thereof, as well as the appended drawings.

To achieve these and other advantages, and in accordance with the purpose of the invention as embodied and broadly described, there is provided a communications system that comprises a channel encoder for encoding a plurality of information bits, a mapping unit coupled to the channel encoder for mapping the plurality of information bits into a first set of quadrature phase shift keying (QPSK) symbols and a second set of QPSK symbols, wherein every successive predetermined number of information bits are mapped to a first QPSK symbol and a second QPSK symbol in one symbol period in accordance with a mapping table, a first modulation unit coupled to the mapping unit for converting the first QPSK symbol into a first QPSK constellation symbol, and a second modulation coupled to the mapping unit for converting the second QPSK symbol into a second QPSK constellation symbol.

In one aspect of the present invention, the communications system further comprises a first and a second antennas coupled to the first and second modulation units, respectively, for transmitting the first and the second QPSK constellation symbols simultaneously.

Also in accordance with the present invention, there is provided a method of enhancing transmission rate in a wireless communication system. The method comprises providing a plurality of information bits, and mapping the plurality of information bits into a first set of quadrature phase shift keying (QPSK) symbols and a second set of QPSK symbols, wherein every successive predetermined number of information bits are mapped to a first QPSK symbol and a second QPSK symbol in one symbol period in accordance with a mapping table.

In one aspect of the present invention, the method further comprises converting the first and the second QPSK symbols into a first QPSK constellation symbol and a second QPSK constellation symbol, respectively.

Still in accordance with the present invention, there is provided a method of enhancing transmission rate in a wireless communication system. The method comprises providing a first mapping table for establishing a correspondence between input binary bits and quadrature phase shift keying (QPSK) symbols, wherein every three successive bits are mapped to a first QPSK symbol and a second QPSK symbol in one symbol period, providing a second mapping table for establishing a correspondence between the QPSK symbols and QPSK constellation symbols, in which each QPSK symbol is mapped to a QPSK constellation symbol, and transmitting simultaneously two QPSK constellation symbols formed by three successive binary bits in one symbol period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings,

FIG. 3A is an equivalent model of a STBC encoder shown in FIG. 1;

FIG. 3B shows a signal constellation for air-combined QPSK symbols;

FIG. 4A shows a virtual constellation mapping in accordance with one embodiment of the present invention;

FIG. 4B shows a signal constellation for air-combined two QPSK symbols in accordance with one embodiment of the present invention.

DESCRIPTION OF THE EMBODIMENTS

Figure 1:
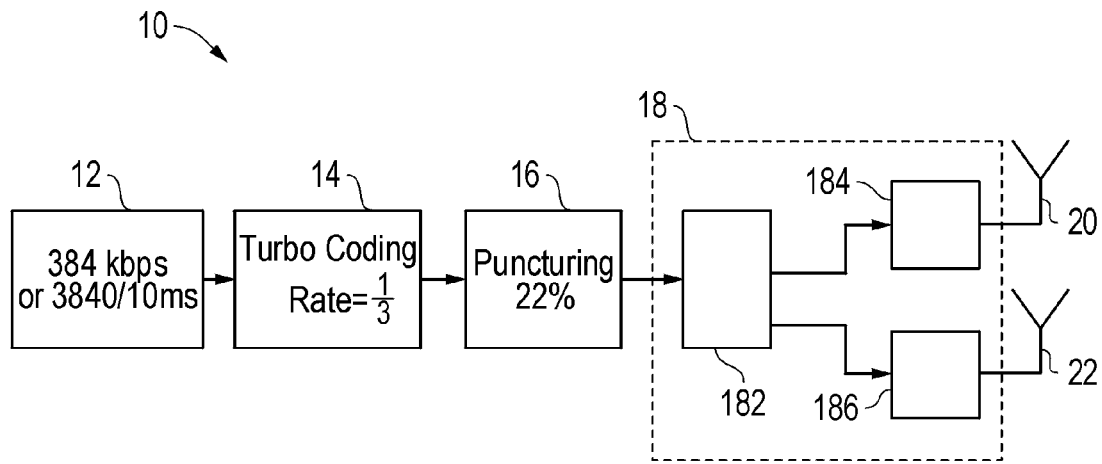
FIG. 1 shows a block diagram of a conventional space-time coding scheme.
Figure 2A:
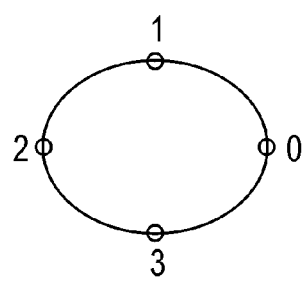
FIGS. 2A and 2B show a QPSK signal constellation for the coding scheme shown in FIG. 1.
Figure 2B:
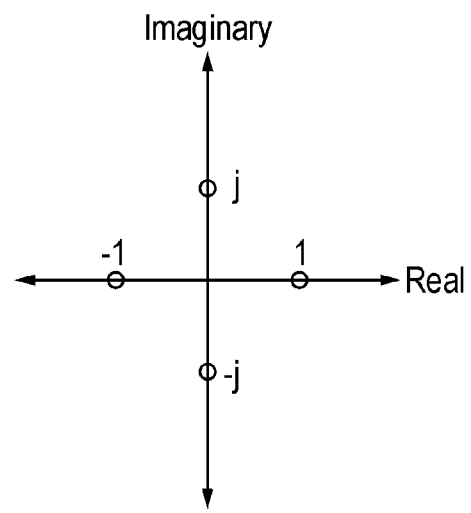

Reference will now be made in detail to exemplary embodiments of the invention, examples of which are illustrated in the accompanying drawings. Wherever possible, the same reference numbers will be used throughout the drawings to refer to the same or like parts.

The present invention provides a communication system and method employing a QPSK virtual constellation mapping ("VCM") scheme. The communication system and method of the present invention improve data transfer rate without changing any transmission bandwidth, transmitted power, or modulation mode in a 3GPP framework.

Generally in a 3GPP framework, QPSK symbols are simultaneously transmitted from two transmitter antennas. For an ideal channel condition, the signal (r) received by the receiver antenna r is represented as:

$$r = C_1 + C_2$$

However, in a real environment, the received signal (r) is a noisy superposition of the two transmitted QPSK symbols corrupted by channel fading. When one receiver antenna is used, the received signal is represented as:

$$r = C_1 \times h_1 + C_2 \times h_2 + n$$

where $C_1$ and $C_2$ are QPSK symbols transmitted from the two transmitter antennas; $h_1$ and $h_2$ are the path gains from the transmitter antennas to the receiver; and n is the additive white Gaussian noise ("AWGN").

Since each of the transmitted QPSK symbols $C_1$ and $C_2$ includes one of our possible values 1, j, −1 or −j, the received signal (r) has one of nine possible values, i.e., 2, 1+j, 2j, −1+j, −2, −1−j, −2j, 1−j or 0, the same values as those shown in the 9-point signal constellation in FIG. 3B. The QPSK symbols $C_1$ and $C_2$ are comprised of four information bits, for example, $b_0$, $b_1$, $b_2$ and $b_3$, such as those shown in FIG. 3A. The four information bits that subsequently form the received signal (r) includes a sample space that consists of sixteen 4-bit members.

Conventional STBC encoders only exhibit nine states, or values, in such a sample space in terms of the sum of the two QPSK symbols. Furthermore, conventional STBC decoders require two successive signals (r) to determine the four input information bits. Since a valid STBC coded block is formed within two QPSK symbol lengths, the spectral efficiency of a conventional STBC encoder is given as:

$$\eta_{STBC} = 4 \text{ bits}/2 \text{ symbol periods} = 2 \text{ (bps/Hz)}$$

To fully utilize the sixteen 4-bit members of the sample space of the sum of two QPSK symbols, a VCM model 50 in accordance with one embodiment of the present invention is proposed and shown in FIG. 4A. Referring to FIG. 4A, VCM model 50 includes a VCM encoder 52 for mapping a first set of input information bits, for example, $B_0$, $B_1$ and $B_3$, into a first QPSK symbol $Q_0'$ for a first antenna output $A_1$ and a second QPSK symbol $Q_1'$ for a second antenna output $A_2$ during one symbol period. The QPSK symbols $Q_0'$ and $Q_1'$ are combined in the air and received by a receiver antenna (not shown). Each of the QPSK symbols $Q_0'$ and $Q_1'$ has one of four possible values 0, 1, 2 and 3, which are mapped to real and imaginary parts 1, j, −1 and −j, respectively. Therefore, the air-combined QPSK symbol has one of eight possible values, 2, 1+j, 2j, −1+j, −2, −1−j, −2j, and 1−j, forming an 8-point signal constellation as shown in FIG. 4B. The mapping mechanism for VCM encoder 52, and the air-combined signal states are shown in a lookup table below.

| Input Binary Bits | Output QPSK Symbols | | Air-Combined Signal States |
|---|---|---|---|
| | QPSK Symbols for First Antenna | QPSK Symbols for Second Antenna | |
| 000 | 0 | 0 | 2 |
| 001 | 0 | 1 | 1 + j |
| 010 | 1 | 2 | −1 + j |
| 011 | 1 | 1 | 2j |
| 100 | 3 | 0 | 1 − j |
| 101 | 3 | 3 | −2j |
| 110 | 2 | 2 | −2 |
| 111 | 2 | 3 | −1 − j |

When every three successive binary bits are fed to VCM encoder 52, a specific QPSK symbol is obtained for antenna output. Since the QPSK symbols generated for each antenna are identical, a sample space of the sum of two QPSK symbols consists of eight 3-bit members. Specifically, each member of the sample space corresponds to one of the 3-bit combinations. Therefore, VCM model 50 of the present invention fully utilizes the 3-bit members to achieve encoding efficiency from the view point of air-combined signal constellation. As compared to a STBC model that transmits four information bits in two symbol periods, VCM model 50 is able to transmit three bits in one symbol period, or six bits in two symbol periods. The spectral efficiency of VCM model 50 is as follows:

$$\eta_{VCM} = 6 \text{ bits}/2 \text{ symbol periods} = 3 \text{ (bps/Hz)}$$

Therefore, without changing any modulation scheme, transmission bandwidth, or transmitted power, the spectral efficiency of the VCM model of the present invention is increased from 2 bps/Hz to 3 bps/Hz.

Figure 5:
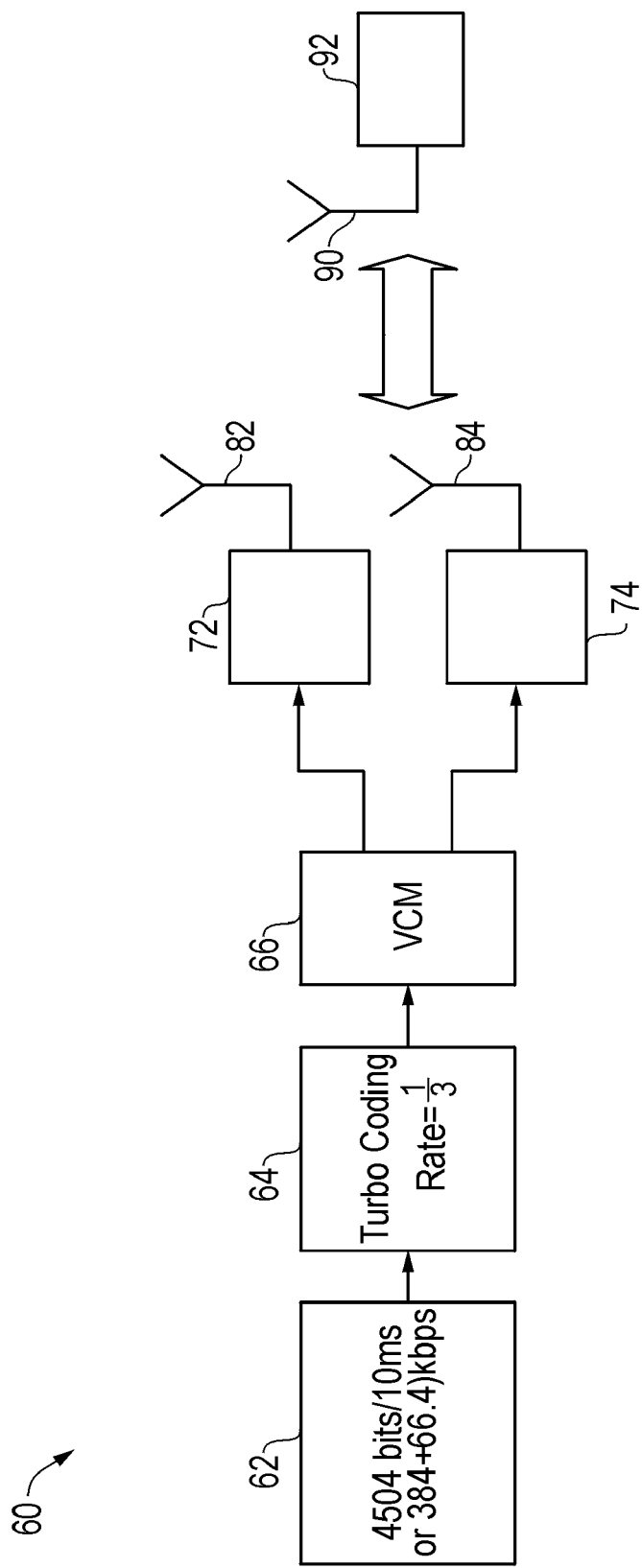
FIG. 5 shows a block diagram of a communication system in accordance with one embodiment of the present invention.

In addition, VCM model 50 may be viewed as a virtual 8-QASK (Quadrature Amplitude Shift Keying) communication system from a receiver's point of view. In one embodiment, VCM model 50 is applicable to a 3GPP WCDMA communication system shown in FIG. 5. Referring to FIG. 5, a communication system 60 consistent with one embodiment of the present invention includes a dedicated transport channel ("DTCH") 62, a channel encoder 64, and a VCM encoder 66. In one embodiment, channel encoder 64, coupled to DTCH 62, is a rate 1/3 turbo encoder that generates code symbols at a rate three times the encoder input. Channel Encoder 64 also provides error detection through a cyclic redundancy check ("CRC"), and includes sixteen padding CRC bits and 4 tail bits.

VCM encoder 66 is coupled to channel encoder 64 and provides a spectral efficiency of 3 bps/Hz. Communication system 60 also includes a first and a second QPSK modulation units 72 and 74, each coupled to VCM encoder 66, a first antenna 82, and a second antenna 84. First and second antennas 82 and 84 are coupled to first and second modulation units 72 and 74, respectively. A receiver antenna 90 connected to a receiver 92 is also shown. First and second modulation units 72 and 74 convert VCM-encoded QPSK symbols to one of Four possible values 1, j, −1 and −j. With VCM encoder 66, communication system 60 is able to increase the data rate at DTCH unit 62 from approximately 384 kbps provided by a conventional STBC system to approximately 450.4 kbps.

As a comparison, assuming the conventional STBC system transmits 4,524 QPSK symbols in 10 ms, the system of the present invention provides the same symbol rate with improved data transfer efficiency. As such, the number of information bits provided from channel encoder 64 to VCM encoder 66 is approximately 13,572 (=4524×3). With a coding rate of 1/3 and 16 padding CRC bits and 4 tail bits, the number of information bits provided from DTCH channel 62 in every 10 ms to channel encoder 64 is approximately 4,504 (13572/3−16−4). That is, communication system 60 provides a data rate of 450.4 kbps, a 17.3% increase from a conventional STBC system. Since system components such as transmission bandwidth, transmitted power, and modulation scheme remain the same, the VCM scheme in accordance with the present invention may be implemented in a 3GPP2 environment where multi-carrier modulation is employed, or a wireless local area network ("LAN") using orthogonal frequency division multiplexing ("OFDM") modulation.

The present invention therefore also provides a method of enhancing transmission rate in a wireless communication system. The method includes providing a plurality of information bits, and mapping the plurality of information bits into a first set of quadrature phase shift keying (QPSK) symbols and a second set of QPSK symbols. In one embodiment, every successive three information bits are mapped to a first QPSK symbol and a second QPSK symbol in one symbol period in accordance with a mapping table. Each QPSK symbol includes one of the four states 0, 1, 2 and 3. Each QPSK symbol is then converted to a QPSK constellation symbol that include one of the four states 1, j, −1 and −j, corresponding to the states 0, 1, 2, and 3, respectively.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A communications system, comprising:
    a channel encoder for encoding a plurality of information bits;
    a mapping unit coupled to the channel encoder for mapping the plurality of information bits into a first set of quadrature phase shift keying (QPSK) symbols and a second set of QPSK symbols,
        wherein every successive predetermined number of information bits are mapped to a first QPSK symbol and a second QPSK symbol in one symbol period in accordance with a mapping table, and the predetermined number of information bits is three;
    a first modulation unit coupled to the mapping unit for converting the first QPSK symbol into a first QPSK constellation symbol; and
    a second modulation unit coupled to the mapping unit for converting the second QPSK symbol into a second QPSK constellation symbol.

2. The system of claim 1, further comprising a first and a second antennas coupled to the first and second modulation units, respectively, for transmitting the first and the second QPSK constellation symbols simultaneously.

3. The system of claim 1, wherein the first and the second set of QPSK symbols include one of four states 0, 1, 2 and 3.

4. The system of claim 1, wherein the first and the second QPSK constellation symbols include one of four states 1, j, −1 and −j.

5. The system of claim 1, further comprising a receiver antenna for receiving QPSK constellation symbols transmitted in a same symbol period and combined in the air.

6. The system of claim 5, wherein the received constellation symbols combined in the air correspond to an 8-point signal constellation that is designed on a transmitter side.

7. The system of claim 1, wherein the channel encoder is a trellis-based channel encoder.

8. A method of enhancing transmission rate in a wireless communication system, comprising:
    providing a plurality of information bits; and
    mapping the plurality of information bits into a first set of quadrature phase shift keying (QPSK) symbols and a second set of QPSK symbols,
        wherein every successive predetermined number of information bits are mapped to a first QPSK symbol and a second QPSK symbol in one symbol period in accordance with a mapping table, and the predetermined number of information bits is three.

9. The method of claim 8, further comprising converting the first and the second QPSK symbols into a first QPSK constellation symbol and a second QPSK constellation symbol, respectively.

10. The method of claim 9, further comprising simultaneously transmitting the first and the second QPSK constellation symbols via a first and a second antennas, respectively.

11. The method of claim 8, wherein the step of providing a plurality of information bits includes error-correcting encoding a different plurality of information bits.

12. The method of claim 11, wherein the error-correcting encoding rate is 1/3.

13. The method of claim 8, further comprising receiving the sum of the QPSK constellation symbols transmitted in a same symbol period.

* * * * *